United States Patent [19]

Shoup

[11] Patent Number: 4,562,328

[45] Date of Patent: Dec. 31, 1985

[54] STUD WELDING TOOL

[75] Inventor: Thomas E. Shoup, Amherst, Ohio

[73] Assignee: TRW Inc., Cleveland, Ohio

[21] Appl. No.: 648,684

[22] Filed: Sep. 10, 1984

[51] Int. Cl.[4] .............................................. B23K 9/20
[52] U.S. Cl. ..................................................... 219/98
[58] Field of Search ................................... 219/98, 99

[56] References Cited

U.S. PATENT DOCUMENTS

| | | | |
|---|---|---|---|
| 3,242,307 | 3/1966 | Mowry et al. | 219/98 |
| 3,809,849 | 5/1974 | Spisak | 219/98 |
| 4,117,297 | 9/1978 | Sholle | 219/98 |
| 4,129,770 | 12/1978 | Gogolin et al. | 219/98 |

Primary Examiner—Clifford C. Shaw
Attorney, Agent, or Firm—Allen D. Gutchess, Jr.

[57] ABSTRACT

A stud welding tool has an improved plunge dampener and an improved lifting mechanism assembly. The plunge dampener is mounted in a front cover of the tool for easy assembly and disassembly. A threaded member controls movement of the dampener to adjust the amount of free travel of a stud and chuck assembly during a plunge stroke in a welding cycle. The lifting mechanism is mounted in a housing as an assembly. The housing is located in a bore or recess in the welding tool body and held in place by a main plunge spring in the tool. The housing and lift mechanism is easily installed and removed for replacement or repair.

18 Claims, 4 Drawing Figures

STUD WELDING TOOL

This invention relates to a stud welding tool having an improved plunge dampener and an improved lift mechanism.

A welding tool for welding studs to workpieces by means of a drawn-arc, stud welding technique includes a chuck assembly having a chuck which holds the stud against the workpiece and which retracts the stud from the workpiece as a pilot arc is initiated. A main welding arc is imposed on the pilot arc and, after a controlled time interval, the chuck plunges the stud against the workpiece, preferably while the main welding arc still persists. When the stud contacts the workpiece again, pools of molten metal on the surface of the workpiece and on the end of the stud then join and solidify to secure the stud to the workpiece. If the stud moves into contact with the workpiece under a relatively high force and high velocity, some of the molten metal may be thrown out some distance in all directions. This molten metal is hazardous as well as being disconcerting to the operator. Further, the molten metal tends to mar the surface of the workpiece as well as the stud shank and surrounding objects. In particular, the splattering metal makes it difficult to accurately control the fillet of the weld metal formed between the stud and the workpiece, the fillet being important to both the strength and appearance of the weld.

During the plunge stroke, the stud preferably first moves rapidly toward the workpiece and subsequently moves at a much slower rate as the molten end of the stud contacts the pool of metal on the workpiece, to minimize splatter of the molten metal. A more consistent weld is thereby possible than if the stud were to move slowly throughout the plunge stroke. The two-speed stroke also tends to assure a hot plunge with the metal continuing to remain molten until contact is made. A plunge dampener effecting this multi-speed plunge stroke is discussed more fully in Mowry et al, U.S. Pat. No. 3,242,307. Another is shown in Gogolin et al, U.S. Pat. No. 4,129,770.

The plunge dampener in accordance with the invention is carried in a chamber in a front cover of the welding tool. As such, the cover can be readily removed and the unit taken out for easy access to repair or replace. The dampener unit has a piston rod with collars engaged by a tang extending from the chuck assembly, with the space between the collars exceeding the thickness of the tang, whereby a predetermined amount of free travel is built into the welding tool, the free travel being at the initial part of the plunge stroke of the stud in which no dampening is effected. Further, a threaded member can be threaded into or out of the chamber to change the amount of free movement of the plunge unit therein, whereby an additional amount of free travel can be added to the fixed amount.

When the stud is initially placed in the chuck, the tip of the stud projects beyond a plane passing through the edge of a spark shield or ferrule which surrounds the stud. When the stud is pressed against the workpiece, it retracts to the plane of the edge and the chuck assembly must be able to yieldably retract into the stud welding tool. The chuck assembly must also be engaged by lifting mechanism in the welding tool to retract the chuck assembly and the stud from the workpiece during the welding cycle. For this purpose, the lifting mechanism includes a lifting ring through which a lifting rod of the chuck assembly extends, with the lifting ring being normally positioned perpendicular to the lifting rod. The rod along with the chuck assembly can then move freely back through the lifting ring when the stud is pressed against the workpiece. The lifting mechanism includes a hook which engages an outer portion of the lifting ring and causes it to move to an angular position or cant when the hook is retracted by a core of an electromagnetic coil. The lifting ring then engages or bites into the lifting rod and retracts the chuck assembly and the stud when the coil is energized until the core engages an adjustable stop in the coil. When the coil is de-energized, a main plunge spring moves the chuck assembly and the stud back toward the workpiece. The basic components of the lifting mechanism are disclosed in Spisak, U.S. Pat. No. 3,809,849.

The lifting mechanism assembly in accordance with the invention includes a housing carrying a stop plate, a lifting hook, a lifting ring, and a lifting ring spring, along with the electromagnetic coil core. These can all be assembled in a bore or recess of the welding tool and removed therefrom as an assembly without any fasteners, the housing being held in place by the main plunge spring which seats against the stop plate.

It is, therefore, a principal object of the invention to provide a welding tool for welding studs to workpieces, which tool has an improved plunge dampener and an improved lifting mechanism.

Another object of the invention is to provide a stud welding tool having a plunge dampener carried by a front cover of the welding tool body.

A further object of the invention is to provide a stud welding tool having a plunge dampener with an external threaded member capable of varying the free travel of a stud during the plunge stroke of the welding cycle.

Yet another object of the invention is to provide a stud welding tool with lifting mechanism carried in a housing which can be placed in and removed from the tool as a unit.

Many other objects and advantages of the invention will be apparent from the following detailed description of a preferred embodiment thereof, reference being made to the accompanying drawings, in which.

Figure 1:
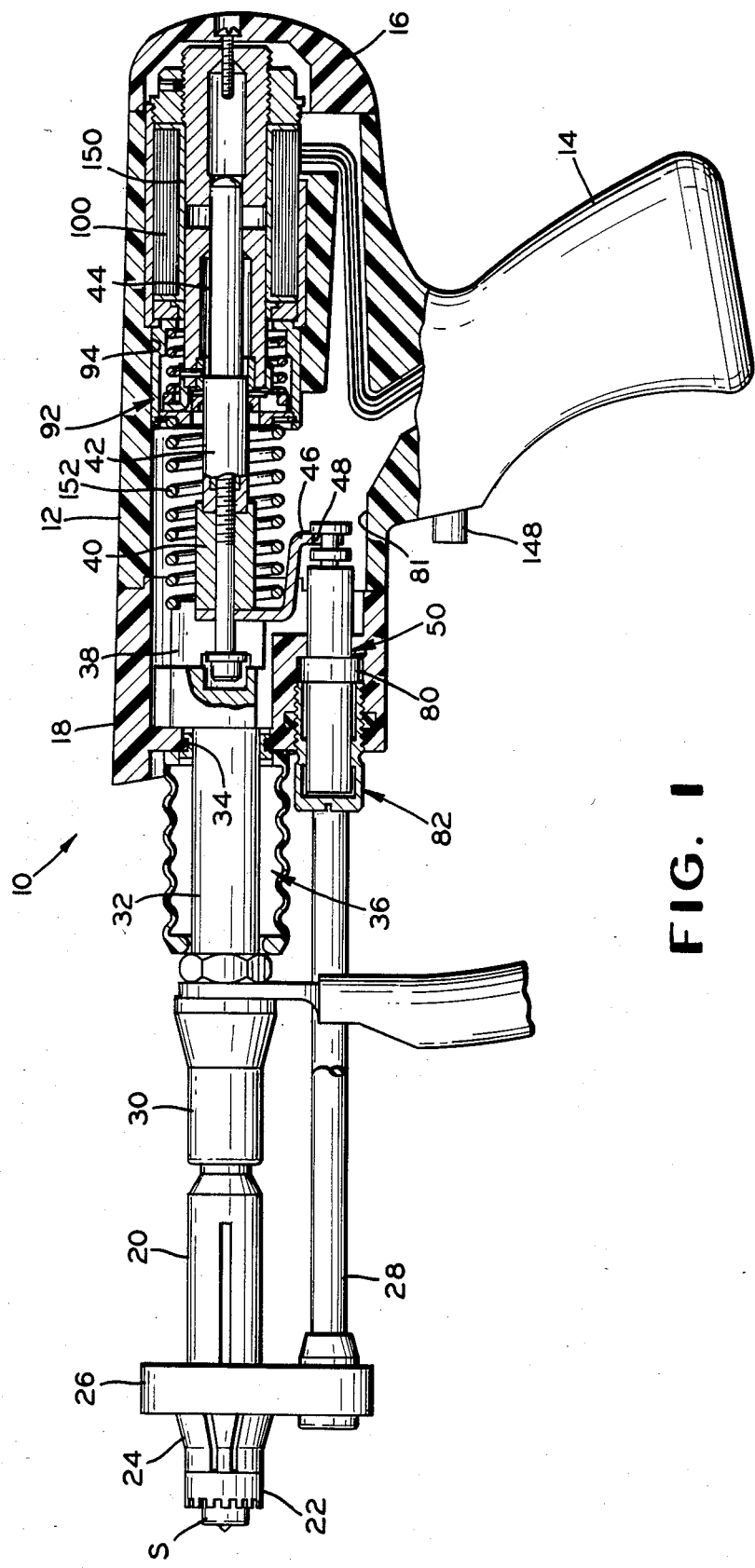
FIG. 1 is a side view in elevation, with parts broken away and with parts in section, of a stud welding tool embodying the invention.

Referring to the drawings, and particularly to FIG. 1, a stud welding tool 10 according to the invention is used to weld a stud designated "S" to a workpiece by means of a drawn-arc welding technique or method. The tool includes means for retracting the stud from the workpiece, means for holding the stud in the retracted position for a predetermined period of time, and means for moving or plunging the stud toward and against the workpiece at the end of the predetermined period. As the stud is retracted from the workpiece, a pilot arc is drawn therebetween and a main welding arc is subsequently imposed on the pilot arc, with the main arc preferably being maintained until the stud is plunged back against the workpiece. This assures that molten metal on the end of the stud and on the workpiece remain molten until the two come into contact.

The tool 10 includes a main body or housing 12 of suitable dielectric material, the body having an integral pistol grip 14, a separate rear end cap 16, and a separate front cover 18. A chuck 20 is located at the front of the tool 10 and holds the stud S during the welding operation. In this instance, the chuck is surrounded by a ceramic ferrule 22 held in a grip 24 extending from a welding foot 26. The foot 26 is adjustably supported by two legs 28, as is known in the art. A permanent spark shield can be used in place of the ceramic ferrule for some applications, if desired.

In this instance, the chuck 20 is held by a chuck adaptor 30 which is mounted on an outer end of a chuck leg 32 which extends outwardly from the tool body through an opening 34 in the front cover 18. The chuck 20, the adaptor 30, and the chuck leg 32 form part of a chuck assembly 36. The chuck assembly 36 further includes a connector 38, a lifting rod sleeve 40, a lifting rod 42, and a lifting rod extension 44.

A tang 46 is clamped between the connector 38 and the lifting rod sleeve 40 and extends downwardly therefrom, having an opening or notch 48 at the lower end.

A plunge dampener unit 50 includes a cylinder 52, a piston 54, and a piston rod 56 having spaced circular flanges 58 and 60 at the outer end. A check valve 62 in the piston 54 and passages 64, 66, and 68 enable substantially unrestricted flow of fluid, specifically oil, from the rod end of the piston 54 to the blind end when the piston moves toward the right, as viewed in FIG. 2. An orifice passage 70 in the piston 54 provides a controlled, restricted flow of oil from the blind end to the rod end of the piston, when the piston moves toward the left, as viewed in FIG. 2.

The plunge dampener unit 50 is carried in a lower chamber or bore 72 in the cover 18. The plunge dampener unit 50, being mounted in the front cover 18, can be relatively easily removed for repair or replacement. The chamber 72 has a threaded end portion 74 with a friction ring 76 and a stop means or shoulder 78. The shoulder 78 can abut an intermediate collar 80 which is located on the cylinder 52 to limit movement of the unit 50 toward an interior chamber 81 formed in the body 12 and closed off by the front cover 18.

A free travel control sleeve 82 has a threaded end portion 84 engaged with the threaded portion 74 of the chamber 72. The sleeve 82 has an open end 86 which can abut the collar 80 on the cylinder 52 and limit movement of the plunge dampener unit 50 in a direction away from the body chamber 81. The sleeve 82 has a closed end 88 with a slot 90 to facilitate turning the sleeve. The sleeve is of clear plastic material to enable an operator to see the position of the cylinder 52 in the chamber 72.

In operation, during the welding cycle, the stud S and the chuck assembly 36 are lifted or retracted as the pilot arc is initiated. The tang 46 accordingly moves rearwardly, away from the workpiece, and engages the circular flange 60 on the piston rod 56. The cylinder 50 accordingly moves rearwardly until the collar 80 abutts the shoulder 78, if not already there. Further movement of the tang 46 moves the piston rod 56 and the piston 54 toward the right, toward the body chamber 80, with the piston moving relatively freely due to the free flow of oil passed the check valve 62. During the plunge stroke the stud S and the chuck assembly 36 move freely until the tang 46 engages the circular flange 58 on the piston rod 56, which results in an initial free travel movement of the stud and chuck assembly. A second, adjustable free travel of the stud and chuck assembly then occurs as the tang 46 moves the plunge dampener unit 50 toward the left until the collar 80 engages the open end 86 of the sleeve 82. As can be seen in FIG. 1, the sleeve 82 is turned into the chamber 72 until the open end 86 abutts the collar 80. In that instance, there is no adjustable free travel, but only the fixed travel which occurs as the tang 46 initially moves toward and against the circular collar 58. As the threaded sleeve is turned outwardly, the amount of adjustable free travel is increased.

Figure 2:
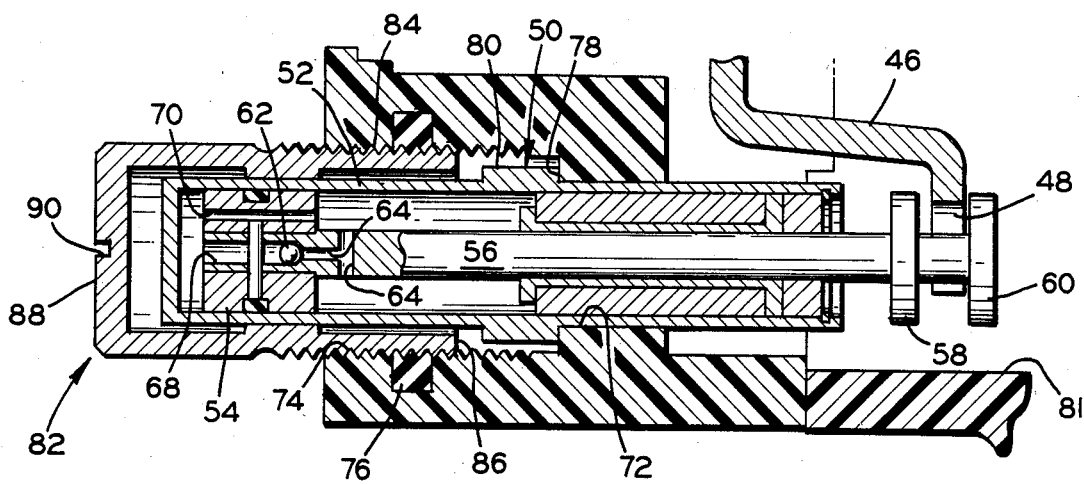
FIG. 2 is an enlarged view in longitudinal cross section of a plunge dampener unit of the tool.

When the collar 80 is in abutting relationship with the open end 86 of the sleeve 82, further travel of the stud S and the chuck assembly 36 during the plunge stroke is restricted as the piston 54 is now moved toward the left, as viewed in FIG. 2, by the tang and the oil trapped between the piston and the blind under the cylinder must flow through the orifice passage 70. The speed of the stud toward the workpiece is accordingly substantially reduced or dampened. This substantially reduces splatter which mars the surface of the workpiece as well as the stud shank and surrounding objects and makes it difficult to accurately control the fillet of the weld metal between the stud and the workpiece.

Figure 3:
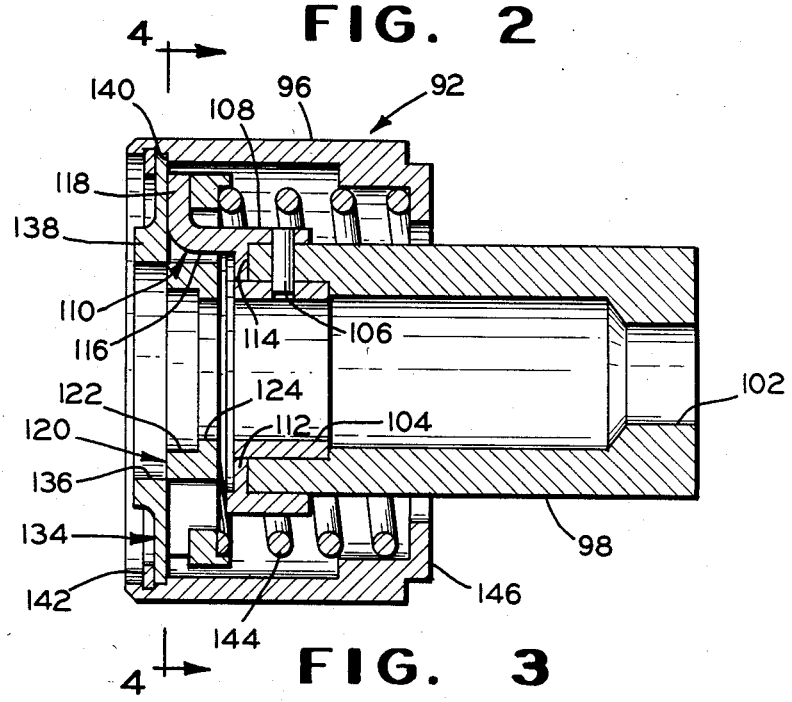
FIG. 3 is an enlarged view in longitudinal cross section of a lifting module of the tool.
Figure 4:
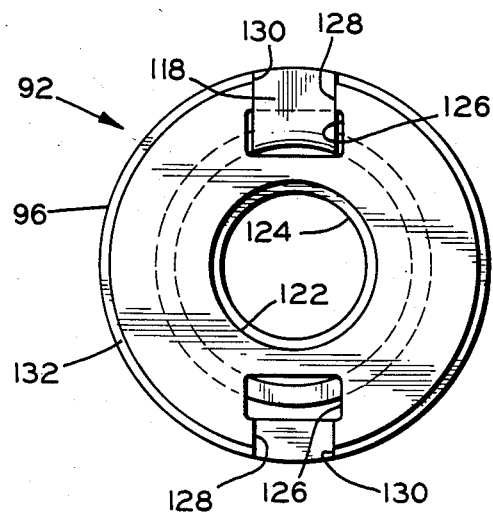
FIG. 4 is a view in section taken along the 4—4 of FIG. 3.

The lifting stroke or retraction of the stud S and the chuck assembly 36 is effected by a lifting module 92. The module is located in an intermediate cylindrical bore 94 in the interior chamber 81 of the welding tool body 12. The module includes a cylindrical housing 96 (FIGS. 3 & 4) which can fit into the bore 94 without special orientation. A moveable coil core 98 is located partly within the housing 96 and extends rearwardly therefrom into an electromagnetic coil 100. The core 98 has a smaller rear bore 102, which receives the lifing rod extension 44, and an oil-impregnated bushing 104 at a forward end which receives and slidably carries a rear portion of the lifting rod 42. A fastening pin 106 extends partly into the bushing 104 and also through a cylindrical collar 108 of a lifting ring hook 110. An annular flange 112 extends inwardly from the collar 108 adjacent a front face 114 of the core 98. An offset 116 extends forwardly from the collar 108 and the flange 112 and terminates in an outwardly-extending tab of ring engaging portion 118.

A lifting ring 120 is also located in the housing 96. The ring 120 has a central opening 122 with an annular, inwardly-extending flange 124 having a closely controlled diameter with square annular edges. The lifting rod 42 extends through the flange 124 in front of the bushing 104. Intermediate, rectangular openings 126 are located about halfway between the opening 122 and the periphery of the ring 120 with the offset 116 being received through one of the openings 126. The outwardly-extending tab 118 then is received in one of two recessed areas 128 terminating at notches 130 in a forwardly-extending, peripheral flange 132 of the lifting ring. The edge of the flange 132 abutts a surface of a stop plate 134 having a central opening 136 and an annular, forwardly facing hub 138. The stop plate 134 is held against a shoulder 140 in the housing 96 by an internal retaining ring 142. The lifting ring 120 is normally held perpendicular to the axis of the lifting rod 42 and against the stop plate 134 by a ring spring 144 which abutts a rear face of the lifting ring 120 and seats against an inwardly-extending flange 146 of the housing 96.

With the lifting ring 120 perpendicular to the axis of the lifting rod 42, the rod is free to move longitudinally. Consequently, when the stud S is first pressed against the workpiece with the tip of the stud being forced back to the front plane of the ferrule 22, the chuck assembly 36, including the lifting rod 42, can move rearwardly accordingly. When a trigger button 148 of the welding tool is pressed, the coil 100 is energized and pulls in the coil core 98 until the core abuts an adjustable core stop 150 located at the rear of the tool. This determines the length of the lifting stroke of the stud S. As the core moves into the coil, the lifting ring tab 118 moves the lifting ring 120 to an angular or canted position, causing the annular edges of the inwardly-extending flange 124 to bite into the lifting rod 42, whereafter further retraction of the core moves the lifting rod 42, the chuck assembly 36, and the stud S rearwardly, away from the workpiece. By providing the lifting ring 120 with the two rectangular openings 126, recessed areas 128, and notches 130, the ring 120 can be turned 180° to use the opposite opening and related areas when the edges of the flange 124 become worn.

The lifting module 92 with the housing 96 can be readily assembled in and removed from the tool 10. The housing 96 is simply inserted in the bore 94 without special orientation and, after the housing is in place, it is held by a main plunge spring 152 which seats against the stop plate 134 around the hub 138 and also seats against a rear portion of the connector 38. No additional or special fasteners are needed to keep the module 92 in place.

From the above, it will be seen that the welding tool according to the invention provides a plunge dampening unit and a lifting module which are easy to assemble and disassemble, with the tool, making repair or replacement thereof along with the overall assembly and disassembly of the welding tool much simpler and easier. The relatively accessible free travel sleeve 82 of the plunge dampening unit also renders it much easier for the operator to control the free travel and dampening effect of the plunge stroke of the stud.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A stud welding tool comprising a tool body forming an interior chamber, said body having a front cover closing off a front portion of said chamber, said cover having a front opening and a lower chamber, a chuck assembly comprising a chuck leg extending through said front opening, a lifting rod in said interior chamber, and connecting means connecting said chuck leg and said lifting rod, a dampening unit movably carried by said lower chamber and having an end extending toward said interior chamber, said unit having a cylinder, a piston in said cylinder, and a piston rod connected to said piston and extending beyond said end of said unit further toward said interior chamber, said piston rod having a collar thereon with spaced apart flanges, a plunge dampener tang rigidly carried by said chuck assembly and having an end extending between said flanges, with the thickness of said tang being less than the space between said flanges, said body forming an intermediate bore in said interior chamber through which said lifting rod extends, a lift mechanism housing in said bore, a core through which said lifting rod extends, a lifting hook in said housing connected to said core, a lifting ring in said housing through which said lifting rod extends, said ring being engageable by said hook to move said lifting rod when said core is moved, a stop plate in said housing adjacent said lifting ring, and a coil spring in said housing engaging said lifting ring and urging said lifting ring toward said stop plate.

2. A stud welding tool according to claim 1 characterized by said dampening unit being engageable with a stop in said lower chamber to limit movement of said unit in one direction, and a threaded member extending into said chamber, moveable toward and away from said stop, and engageable with said unit to limit movement of said unit in the opposite direction.

3. A stud welding tool according to claim 2 characterized by said cylinder of said dampening unit having a collar engageable with said stop in said lower chamber and said collar being engageable with said threaded member to limit movement of said dampening unit in the opposite direction.

4. A welding tool according to claim 2 characterized by said threaded member being a threaded sleeve of clear plastic material.

5. A stud welding tool according to claim 1 characterized by said intermediate bore and said housing having cylindrical portions, whereby said housing can be received in said bore without special orientation.

6. A stud welding tool according to claim 1 characterized by said coil spring having one end seated against an inwardly extending flange of said housing.

7. A stud welding tool according to claim 1 characterized by a plunge spring in said interior chamber, engaging said stop plate, and retaining said housing in said bore.

8. A stud welding tool comprising a tool body forming a interior chamber, said body having a front cover closing off a front portion of said chamber, said cover having a front opening and a lower chamber, a chuck assembly comprising a chuck leg extending through said front opening, lifting rod means in said interior chamber, and connecting means connecting said chuck leg and said lifting rod means, a dampening unit movably carried by said lower chamber and having an end extending toward said interior chamber, said unit having a cylinder, a piston in said cylinder, and a piston rod connected to said piston and extending beyond said end of said unit further toward said interior chamber, said piston rod having spaced apart flanges at an outer end portion thereof, a plunge dampener tang rigidly carried by said chuck assembly and having an end extending between said flanges, with the thickness of said tang being less than the space between said flanges, whereby a fixed amount of free travel is effected after a stud is retracted and then plunged back toward a workpiece.

9. A stud welding tool according to claim 8 characterized by said plunge dampener tang end having a notch extending around said piston rod between said flanges.

10. A stud welding tool according to claim 8 characterized by said plunge dampener tang being clamped between said connecting means and said lifting rod means.

11. A stud welding tool comprising a tool body forming an interior chamber, said body having a front cover closing off a front portion of said chamber, said cover having a front opening and a cover chamber, a chuck assembly comprising a chuck leg extending through said front opening, a lifting rod in said interior chamber, and connecting means connecting said chuck leg and said lifting rod, a dampening unit movably carried by said cover chamber and having an end extending toward said interior chamber, said dampening unit having a cylinder, a piston in said cylinder, and a piston rod connected to said piston and extending beyond said end of said unit further toward said interior chamber, a plunge dampener tang rigidly carried by said chuck assembly and having an end engageable with said piston rod, said cover chamber having a stop engageable with said dampening unit to limit movement of said dampening unit in one direction, and a member extending into said cover chamber, moveable toward and away from said stop, and engageable with said dampening unit to limit movement of said unit in the opposite direction.

12. A stud welding tool according to claim 11 characterized by said cylinder of said dampening unit having a collar engageable with said stop in said cover chamber and said collar being engageable with said member.

13. A stud welding tool according to claim 11 characterized by said member being a threaded sleeve of clear plastic material.

14. A stud welding tool according to claim 11 characterized by said piston rod having spaced apart flanges between which said tang end engages said piston rod.

15. A stud welding tool comprising a tool body forming an interior chamber, a chuck assembly comprising a chuck leg extending from said tool body, a lifting rod in said interior chamber and connected to said chuck leg, said body forming an intermediate bore in said chamber through which said lifting rod extends, a lifting module comprising a housing in said bore, a core through which said lifting rod extends, a lifting hook in said housing connected to said core, a lifting ring in said housing through which said lifting rod extends, said ring being engageable by said hook to move said lifting rod when said core is moved, a stop plate in said housing adjacent said lifting ring, means removably mounting said stop plate in a fixed position in said housing, and a coil spring in said housing engaging said lifting ring and urging said lifting ring toward said stop plate, said housing being separable from said bore whereby said housing, said lifting hook, said lifting ring, said stop plate, said removably mounting means, and said coil spring can be inserted into and removed from said bore as a unit.

16. A stud welding tool according to claim 15 characterized by a plunge spring in said interior chamber, engaging said stop plate, and retaining said module in said bore.

17. A stud welding tool according to claim 15 characterized by said coil spring having one end seated against an inwardly-extending flange of said housing.

18. A stud welding tool according to claim 15 characterized by said intermediate bore and said housing having cylindrical portions whereby said housing can be received in said bore without special orientation.

* * * * *

UNITED STATES PATENT OFFICE
CERTIFICATE OF CORRECTION

PATENT NO. : 4,562,328

DATED : December 31, 1985

INVENTOR(S) : Thomas E. Shoup

It is certified that error appears in the above-identified patent and that said Letters Patent are hereby corrected as shown below:

Column 4, line 43, "of" should be -- or --.

Column 4, line 43, after "ring" insert -- - --.

Signed and Sealed this

First Day of April 1986

[SEAL]

Attest:

DONALD J. QUIGG

Attesting Officer

Commissioner of Patents and Trademarks